United States Patent
Parron et al.

(10) Patent No.: US 8,165,583 B2
(45) Date of Patent: Apr. 24, 2012

(54) CELLULAR SCANNING OPTIMIZATION IN MULTIMODE WIRELESS TERMINAL

(75) Inventors: Jerome Parron, Toulouse (FR); Loic Bavois, Frouzins (FR)

(73) Assignee: Motorola Mobility, Inc., Libertyville, IL (US)

(*) Notice: Subject to any disclaimer, the term of this patent is extended or adjusted under 35 U.S.C. 154(b) by 1103 days.

(21) Appl. No.: 11/457,955

(22) Filed: Jul. 17, 2006

(65) Prior Publication Data

US 2008/0014940 A1  Jan. 17, 2008

(30) Foreign Application Priority Data

Jul. 15, 2005 (EP) .................................. 05300595

(51) Int. Cl.
*H04W 4/00* (2009.01)
(52) U.S. Cl. .................. 455/435.2; 455/552.1; 455/434; 455/435.1
(58) Field of Classification Search .... 455/552.1–553.1, 455/434, 435.1–435.3
See application file for complete search history.

(56) References Cited

U.S. PATENT DOCUMENTS

| | | | |
|---|---|---|---|
| 6,360,097 B1* | 3/2002 | Smith et al. | 455/434 |
| 2002/0147008 A1* | 10/2002 | Kallio | 455/426 |
| 2002/0147024 A1 | 10/2002 | Wan | |
| 2003/0017842 A1 | 1/2003 | Moles et al. | |
| 2004/0120278 A1* | 6/2004 | Krantz et al. | 370/328 |
| 2004/0176024 A1* | 9/2004 | Hsu et al. | 455/3.04 |
| 2004/0203893 A1* | 10/2004 | Kotzin | 455/456.1 |
| 2005/0239498 A1* | 10/2005 | Dorenbosch et al. | 455/552.1 |

FOREIGN PATENT DOCUMENTS

| | | |
|---|---|---|
| EP | 1496719 A1 | 1/2005 |
| EP | 1526682 A2 | 4/2005 |
| GB | 2358550 A | 7/2001 |

* cited by examiner

*Primary Examiner* — Steven Lim

(57) ABSTRACT

A multimode wireless communication terminal capable of operating on a cellular communication network and a second communication network, for example, an unlicensed mobile access (UMA) point, wherein the terminal scans (412) for service on the cellular communication network only when the signal quality of the second communication network satisfies a signal quality condition, and the terminal increases a cellular scan time interval (420) when the cellular communication network environment remains unchanged.

11 Claims, 4 Drawing Sheets

CELLULAR SCANNING OPTIMIZATION IN MULTIMODE WIRELESS TERMINAL

FIELD OF THE DISCLOSURE

The present disclosure relates generally to wireless communications, and more particularly to scanning for cellular service in a multimode communication device connected to an unlicensed mobile access (UMA) point, multi-mode communication terminals and methods.

BACKGROUND OF THE DISCLOSURE

Multi-mode wireless communication terminals capable of communicating on GSM cellular networks and using unlicensed mobile access (UMA) technology, for example, WiFi or Bluetooth, are known generally. When a GSM/UMA mobile station is camped on an unlicensed mobile access point, the GSM radio operates in a null, hibernate or passive mode during which power consumption is substantially reduced. When the UMA link quality deteriorates during a UMA call, the mobile station must handover to a cell in the GSM network. In some instances, the UMA call may be dropped before selection on the GSM network is completed, for example, when the UMA link quality deteriorates rapidly.

In one known implementation, periodic selection is performed every 30 seconds on the GSM network when the mobile station is camped on a UMA network to ensure prompt rove out or handover to GSM. Frequent scanning of the GSM network however increases the burden on processing resources, since the UMA and GSM stacks are active simultaneously. The relatively high frequency rate at which GSM selection is performed thus draws substantial current, which adversely affects battery life.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
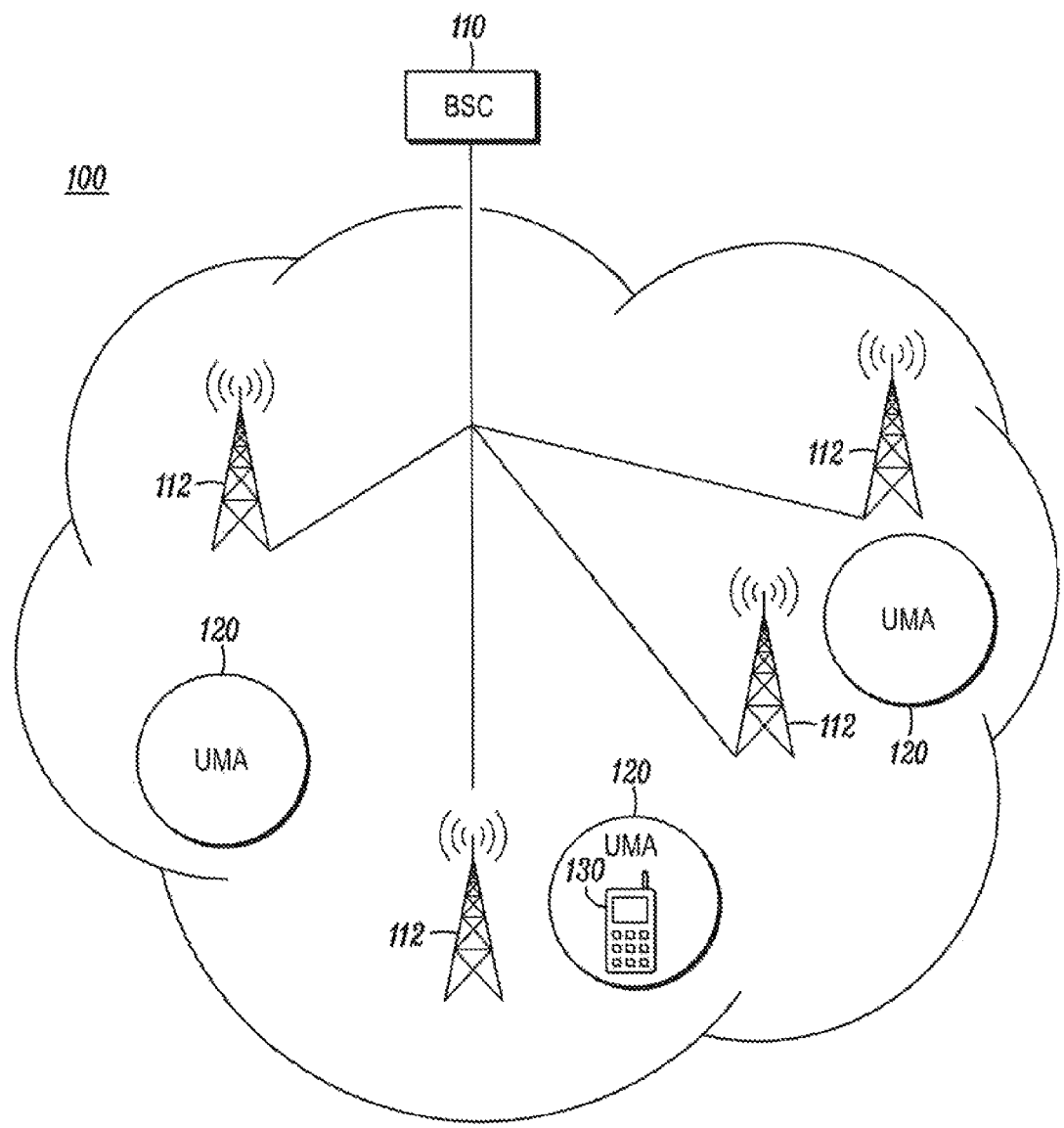
FIG. 1 is an exemplary wireless communication system.

In FIG. 1, the exemplary wireless communication system 100 comprises generally a cellular communication network and another wireless communication network, for example, 802.xx, Bluetooth, or some other open or proprietary protocol that is different than the protocol of the cellular communication network. The exemplary cellular communication network includes a base station controller 110 communicably coupled to a plurality of base transceiver stations 112 that serve corresponding cellular areas. More generally there are multiple base station controllers with corresponding base transceiver stations. The cellular communication network also includes entities, for example, a visitor location register (VLR), gateways to other networks, etc., not illustrated but well known to those of ordinary skill in the art. Exemplary cellular communication networks include Global System for Mobile Communications (GSM) and $3^{rd}$ Generation (3G) UMTS communication networks, among other existing and evolving wireless communication protocols. In FIG. 1, the other wireless communication network is embodied as multiple unlicensed mobile access (UMA) areas 120, although it could be some other type of network having isolated coverage areas. A multimode mobile wireless communication terminal 130 traveling within the networks may communicate on the cellular network or the other isolated networks as discussed further below.

Figure 2:
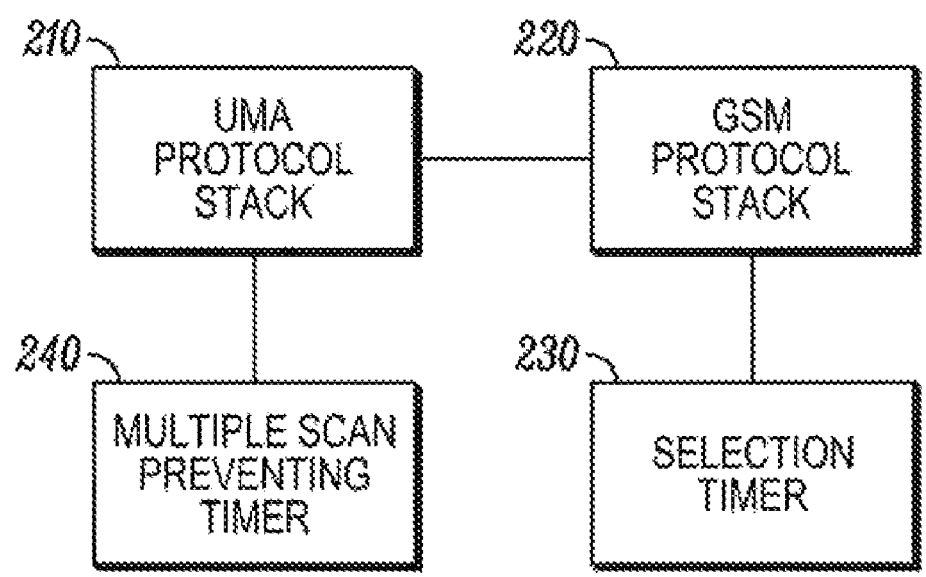
FIG. 2 is a partial schematic block diagram of an exemplary wireless communication terminal.

The exemplary wireless communication terminal or device 200 of FIG. 2 comprises a first protocol stack 210 in the exemplary form of an unlicensed mobile access (UMA) stack and a second protocol stack 220 in the exemplary form of a GSM stack. A selection timer 230 is communicably coupled to the cellular stack 220 for controlling the time period between scans as discussed more fully below. In one embodiment, the mobile terminal does not scan for service on the cellular communications network when the mobile terminal is camped on the UMA network.

In some embodiments, a timer 240 is communicably coupled to the UMA or other protocol stack 220. The timer prevents excessive switching between protocols, for example, when the signal quality is fluctuating rapidly. The timer is started once a scanning mode request has been sent to the GSM stack after the link quality transitions from acceptable to unacceptable. The UMA stack cannot send another scanning mode request to the other stack while the timer is running. Upon timer expiration, the UMA stack sends the scanning mode request to the GSM stack only if the link quality is still unacceptable and if the GSM stack is not already in scanning mode. The timer 240 is referred to as a multiple scan prevention timer as discussed more fully below.

Figure 3:
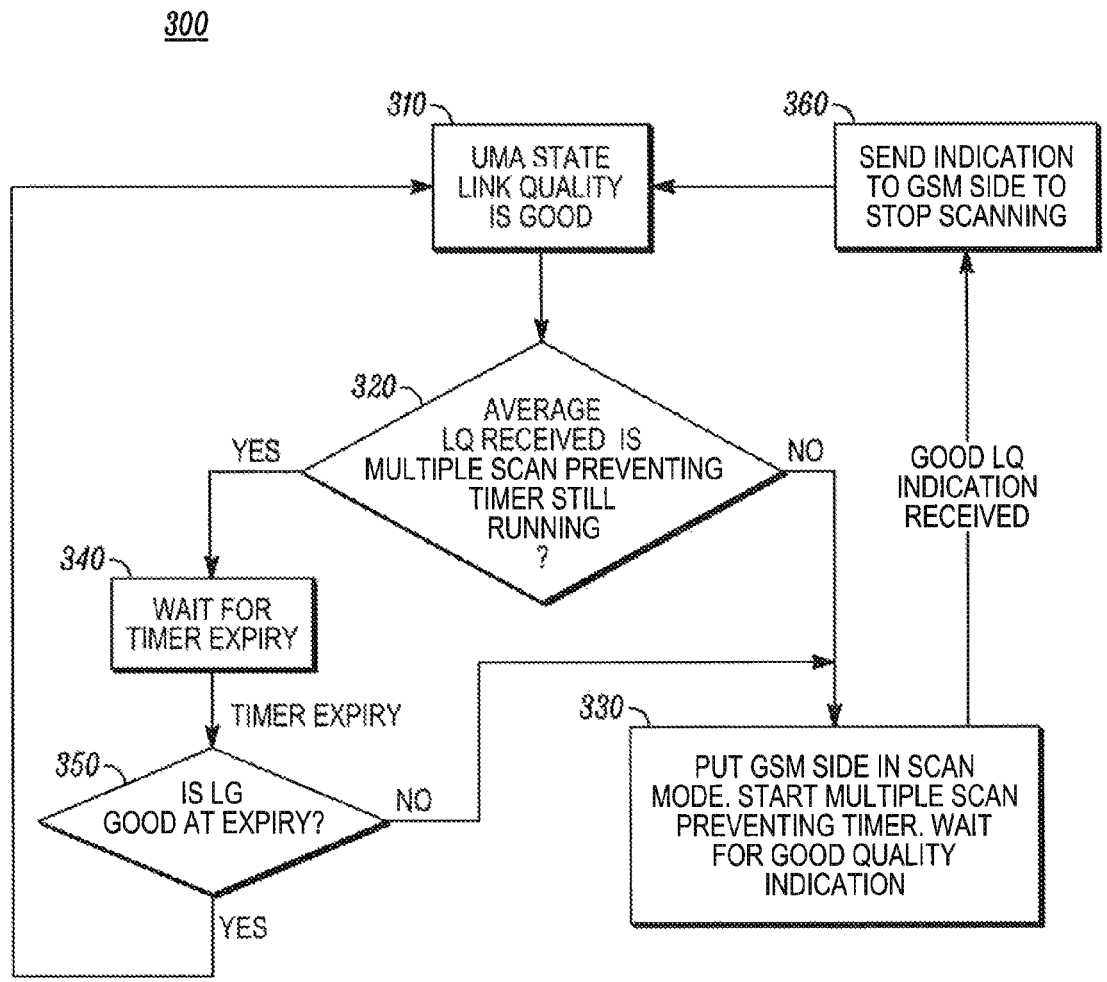
FIG. 3 is an exemplary state diagram for an unlicensed mobile access (UMA) stack on a wireless communications terminal.

FIG. 3 is a UMA or other network stack state diagram 300 for an exemplary multimode wireless communication device having a UMA or other protocol stack and a GSM stack. At state 310, the UMA or other protocol link quality is "good". The terms "good" and "average" used to characterize the UMA link quality are associated with measurable conditions. For example, the quality of the UMA link may be assessed or measured by many different schemes including, but not limited to, those based on whether received signal strength, bit error rate (BER), etc. satisfies or fails to satisfy a condition or threshold requirement. In the instant disclosure, "good" is indicative of an acceptable link quality while "average" is indicative of unacceptable link quality.

When the link quality on the UMA side becomes unacceptable, a command is sent from the UMA stack to transition the GSM stack to scanning mode. The scan command is only triggered when a UMA link quality condition is satisfied. In FIG. 3, at state 320, the exemplary UMA link quality deteriorates from good to average. At state 330, the GSM stack is put into scan mode by sending a scan request from the UMA stack to the GSM stack. In the exemplary embodiment, there is no scanning on the cellular or GSM communication network when the terminal is camped on the UMA access point, thereby reducing power consumption associated with cell scanning while the mobile terminal is camped on the UMA access point.

In FIG. 3, for embodiments where the mobile terminal includes a timer associated with the UMA protocol stack to maintain some temporal distance between cell scan requests, the timer is set at state 330 when cellular scanning begins, for example, upon sending a scan request from the UMA stack to the cellular stack. At state 320, when the UMA link quality deteriorates, the UMA stack will not send a cell scan request to the cellular stack if the multiple scan preventing timer is still running. At state 340, the UMA stack waits for the timer to expire before sending the cell scan request. At state 350, the cell scan request is sent if the UMA link quality is still unacceptable upon expiration of the timer. If the link quality becomes acceptable before the timer expires, the terminal resumes camping on the UMA access point at state 310.

After scanning begins on the GSM side, the scanning is stopped if the link quality becomes acceptable again. In FIG. 3, at state 350, after requesting a cell scan, the UMA stack waits for a good quality indication. At 360, the UMA stack sends a stop scanning request to the GSM stack when the UMA link quality becomes acceptable, or satisfies the "good" condition, as discussed further below in connection with FIG. 4.

Figure 4:
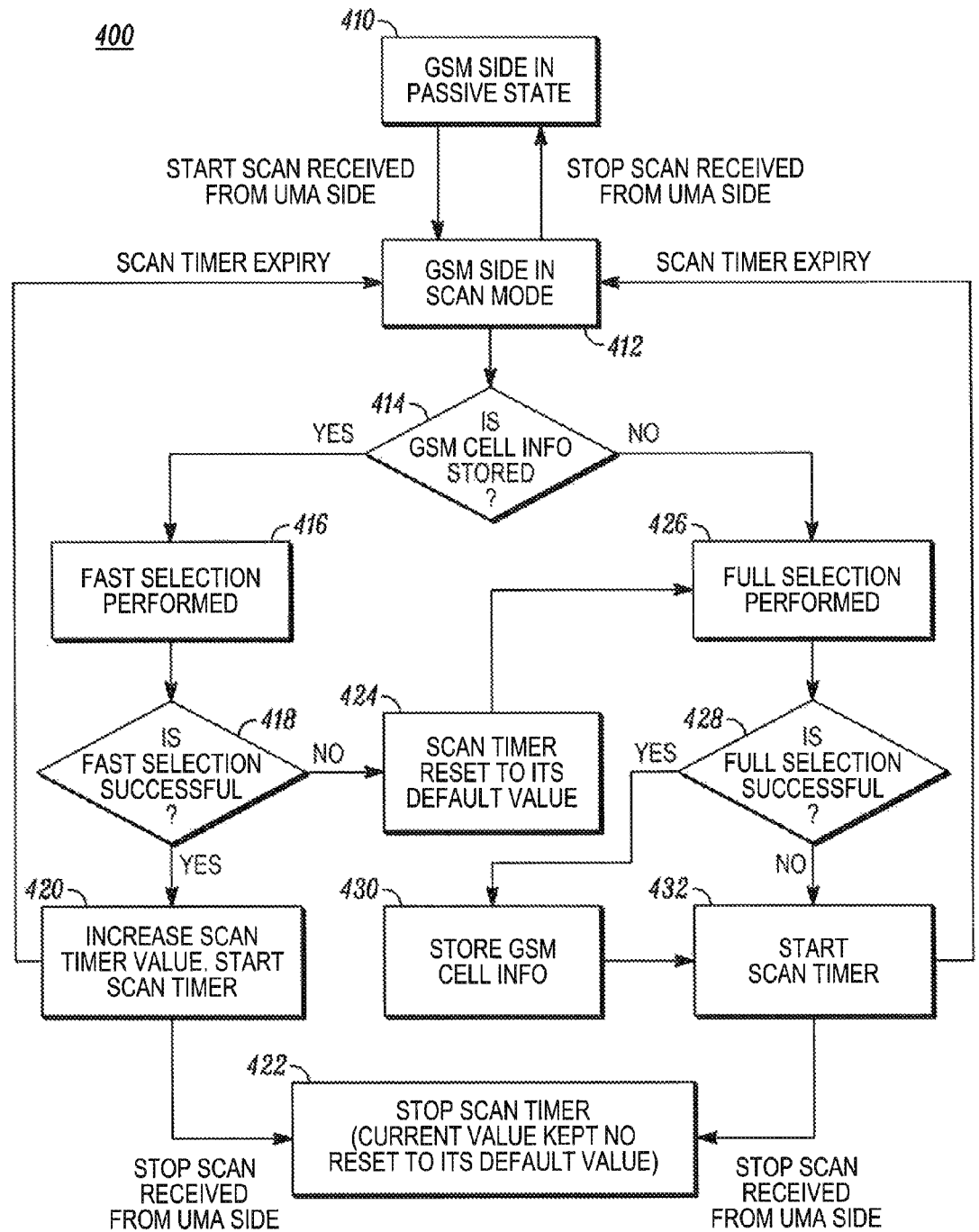
FIG. 4 is an exemplary state diagram for a GSM cellular stack on a wireless communications terminal.

FIG. 4 is a GSM or other cellular stack state diagram 400 for the exemplary multimode wireless communication device having a UMA stack and a GSM stack. At state 410, the exemplary GSM protocol stack is in a passive state wherein no scanning occurs. Upon receipt of a scan request from the UMA or other protocol stack, the GSM stack transitions into a scanning mode state 412. Similarly, when the mobile terminal is camped on the cellular network, scanning is terminated upon receipt of a stop scan command from the other protocol stack, for example, the UMA stack in FIG. 3. The stop scan command is sent when the UMA link quality improves and the terminal transitions to UMA service. There is no scanning for cellular service when the terminal is camped on the UMA access point or other network.

Once cellular scanning begins, the exemplary GSM stack performs periodic selection. In cellular scanning mode, the selection procedure is performed each time the scanning timer expires. In one embodiment, the selection period depends on the result of the previous selection. As the coverage of most UMA access points are much smaller than GSM cells, the GSM environment often remains near a specific access point. Consequently, if a suitable GSM cell has been found in this environment, there is a high probability that each selection procedure returns the same cell. Once a selection procedure has been performed, the cell identity returned is compared to a stored cell identity from the previous selection. If the cell identities are the same, the scan time period in the GSM stack is increased. In the absence of a match, the cellular scan time period is set to a default value. Thus on the cellular side, the time between two selection procedures increases as long as the GSM environment remains the same. Power consumption and the computational resource load are generally reduced as the selection procedure becomes less frequent.

In FIG. 4, in one embodiment, fast cell selection is performed at block 416 if cell information has been stored, which is determined at block 414. If fast cell selection is successful at block 418, the cell scan timer is incremented before starting the timer at 420. According to this aspect of the disclosure, the scan interval is increased relative to a prior level or relative to a default level if the currently selected cell is the same as a previously selected cell. At 422, in response to receiving a stop scan request from the UMA or other protocol stack, the scan timer is stopped. In one embodiment, at 422, the current timer period is saved or stored in memory without resetting the timer to its default value.

In FIG. 4, at block 418, if the fast scan attempt is unsuccessful, the scan timer is set to its default value at 424 and a full selection algorithm is performed at state 426. A full selection is also performed at 426 if no prior cell information has been stored at 414. If the full selection is successful at 428, the selected cell information is stored at 430. The scan timer is started at 432, usually at the default scan interval. The scan timer is stopped at 422 in response to receiving a stop scan request from the UMA or other protocol stack, as discussed above. The scan process resumes at 412 upon expiration of the scan timer at blocks 420 and 432.

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication device capable of operating on a cellular communication network and a second communication network, the method comprising:
camping on the second communication network;
scanning for service on the cellular communication network only when the signal quality of the second communication network satisfies a signal quality condition and not scanning for service on the cellular communication network when camped on the second communication network and when the signal quality of the second communication network does not satisfy the signal quality condition;
selecting a cell on the cellular communication network;
increasing the interval between scans if a currently selected cell on the cellular communication network is the same as a most recently selected cell on the cellular communication network when camped on the cellular communication network.

2. The method of claim 1, increasing the interval between scans when camped on the cellular communication network by incrementing a scan timer period if the currently selected cell is the same as the most recently selected cell.

3. The method of claim 2, selecting a default scan timer period when camped on the cellular communication network if the currently selected cell is different than the most recently selected cell.

4. The method of claim 1,
starting a timer in response to a request to scan for service on the cellular communication network,
precluding the generation of another request to scan for service on the cellular communication network until after the timer expires.

5. The method of claim 4, originating the request to scan for service on the cellular communication network when the signal quality of the second communication network satisfies the signal quality condition.

6. The method of claim 1, scanning for service on the cellular communication network in response to a request generated when the signal quality of the second communication network satisfies the signal quality condition.)

7. The method of claim 6, terminating the scanning for service in response to a request generated when the signal quality of the second communication network no longer satisfies the signal quality condition.

8. A multimode wireless communication device, the device comprising:
a first stack for communicating on a first communication network, the first stack monitoring a link quality of the first communication network when the multimode wireless communication device is communicating on the first communication network;
a cellular stack for communicating on a cellular communication network, the cellular stack scanning for service on the cellular communication network only when the signal quality of the first communication network satisfies a signal quality condition when the wireless communication device is camped on the first communication network and the cellular stack not scanning for service on the cellular communication network when camped on the second communication network and when the signal quality of the first communication network does not satisfy the signal quality condition,
the cellular stack increasing an interval between scans if a currently selected cell on the cellular communication network is the same as a most recently selected cell on the cellular communication network when camped on the cellular communication network.

9. The device of claim 8,
a selection timer communicably coupled to the cellular stack,
the selection timer incrementing a time period of the selection timer to increase the interval between scans if the currently selected cell is the same as the most recently selected cell when the multimode wireless communication device is camped on the cellular communication network,
the selection timer selecting a default selection timer period if the currently selected cell is different than the most recently selected cell when camped on the cellular communication network.

10. The device of claim 8,
a timer communicably coupled to the first stack,
the timer set in response to the first stack sending a request to the cellular stack to scan for service on the cellular communication network,
the timer precluding the generation of another request to scan for service on the cellular communication network until after the timer expires.

11. The device of claim 8, the first stack originating a request for the cellular stack to scan for service on the cellular communication network when the signal quality of the first communication network satisfies the signal quality condition.

* * * * *